Jan. 26, 1954 L. L. BURNS, JR., ET AL 2,667,621

TORSIONAL FILTER

Original Filed March 30, 1949

INVENTORS
LESLIE L. BURNS, JR.
WALTER VAN B. ROBERTS
BY Harry Tunick
ATTORNEY

Patented Jan. 26, 1954

2,667,621

UNITED STATES PATENT OFFICE 2,667,621

TORSIONAL FILTER

Leslie L. Burns, Jr., and Walter van B. Roberts, Princeton, N. J., assignors to Radio Corporation of America, a corporation of Delaware Original application March 30, 1949, Serial No. 84,372. Divided and this application June 7, 1950, Serial No. 166,618

3 Claims. (Cl. 333—71)

This application is a division of our copending application, Serial No. 84,372, filed March 30, 1949.

This invention relates to electromechanical filters. More particularly, it relates to bandpass filters of the mechanically-vibrating type.

As described in the parent application previously referred to, several advantages are obtained through the use of mechanical resonators in filters for low radio frequencies. Such resonators are small, inexpensive, and have very high Q's as compared to those of electrical circuits.

According to the parent application, bandpass filters having extremely narrow passbands have been obtained by the use of mechanical resonator structures. Such structural arrangements generally consist of at least two mechanical resonant elements, aligned but spaced apart, with other elements positioned between and coupling together adjacent resonant elements. Such coupling elements have mechanical impedances different from those of the resonant elements. In effect, such coupling elements function to loosely couple together the resonant elements.

Generally, such filters may be either flat (being punched out of strip or sheet stock) or may be formed as figures of revolution, having circular cross-section throughout. The filters of circular cross section have narrower passbands. Also, this construction is convenient, since such filters may be relatively easily machined out of round stock.

For most purposes, the mechanical filter must be driven from an electrical source and deliver power to an electrical load. This requires some form of electromechanical conversion. For electromechanical filters of the aforementioned type, the magnetostrictive type of electromechanical conversion has been found useful and convenient. The filters are driven by means of a coil coupled to the mechanical resonant element at one end of the array, and take-off to an electrical circuit is by means of a coil coupled to the mechanical resonant element at the opposite end of the array. For magnetostrictive drive and take-off, the material used for the drive and take-off tanks or resonant elements must of course be magnetostrictive. In many cases, thin-walled nickel tubing makes good end tanks, nickel having good magnetostrictive activity. For extremely narrow bands, however, nickel-plated aluminum comes nearer to providing the relatively low damping called for by the narrow band. This nickel plating makes possible magnetostrictive driving of, and take-off from, the tanks, in accordance with the principles disclosed in the copending Burns application, Serial No. 84,373, filed March 30, 1949, now U. S. Patent No. 2,619,604, issued on November 25, 1952.

Filters of the type referred to above will operate with torsional waves, provided, of course, that they are formed as figures of revolution, having circular cross-section throughout.

An object of this invention is to provide an electromechanical filter which utilizes torsional vibrations.

Another object is to devise arrangements for causing mechanical resonators to execute torsional vibrations.

A further object is to devise arrangements for magnetostrictively driving mechanical resonators in torsion.

The foregoing and other objects of this invention will be best understood from the following description of some examples thereof, reference being had to the accompanying drawing, wherein.

Figures 1, 2, 3, 4:
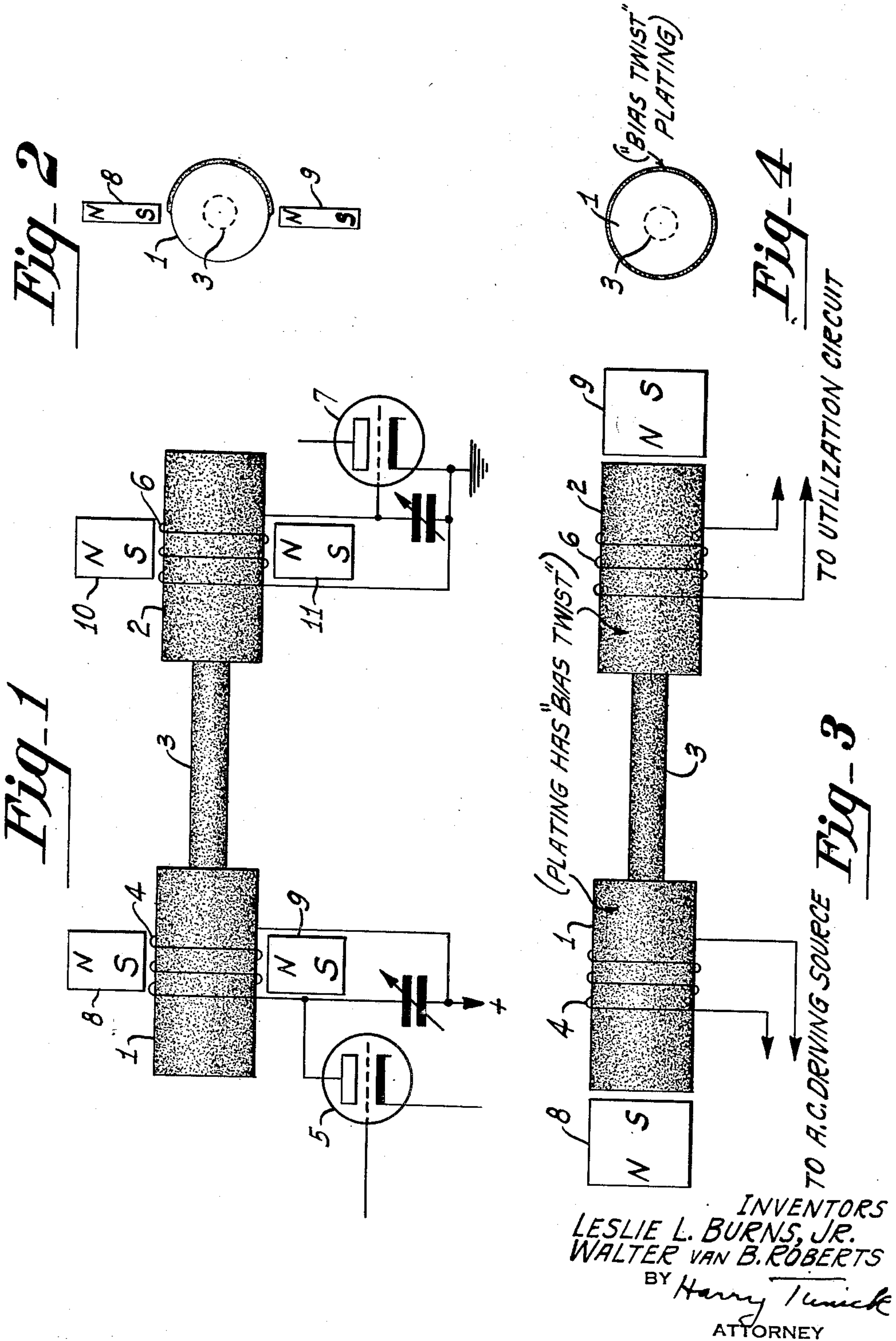
Fig. 1 is a plan view of one torsional drive arrangement according to this invention.
Fig. 2 is an elevation of the Fig. 1 arrangement.
Fig. 3 is a plan view of a modified arrangement.
Fig. 4 is an elevation of the Fig. 3 arrangement.

The objects of this invention are accomplished, briefly, in the following manner: In one embodiment, half the circumference of the drive and take-off resonant elements is plated with magnetostrictive material, and a transverse magnetic field is applied in the plane including the edges of the plating. Torsional vibration is produced by the combination of this field with an alternating longitudinal magnetization. In other embodiments, "bias twist" of the magnetostrictive plating is obtained, this providing torsional drive when acted on by an alternating longitudinal magnetic field.

The propagation of torsional waves along a rod is governed by the same equations as for linear vibrations. The wave length for torsional waves, however, is only about 60 per cent of that for linear vibrations at the same frequency. The wave length is independent of the diameter of the element, like the linear vibration wave length, at least for sufficiently small diameters. This characteristic makes low frequency filters more compact, being therefore advantageous, but is disadvantageous at frequencies so high that tanks or resonant elements are inconveniently short.

Torsional operation has at least two important advantages, however, which will in some cases outweigh its disadvantages.

In the first place, some materials, such as magnesium, have a uniquely high Q when operated in torsion. Magnesium has a Q of about 100,000 when so operated. This extremely high Q is not unique to torsion, but may result when the material is distorted for vibrations in other shearing modes. However, torsional vibrations provide a good practical method for taking advantage of this uniquely high Q. For the internal sections of any filter, it is generally desirable to use a material of the highest possible Q. This last statement is applicable also to electrical filters utilizing resonant or tuned circuits. Generally, the higher the Q, the narrower the bandwidth of the bandpass filter (BPF) can be made. Narrow bandwidths are often required.

Generally, the bandwidth of a BPF of this invention's type depends upon the ratio of the mechanical (or characteristic) impedances of the resonant elements and the coupling elements or sections. Thus, for a filter in which the coupling element between resonant elements has a diameter less than the diameters of the resonant elements (herein termed a "neck-coupled filter"), the smaller the neck diameter, the narrower the bandwidth. This is true because, generally speaking, the mechanical impedance of the material depends upon its cross-sectional area. Therefore, it is desirable, for a neck-coupled filter, to have a large ratio of characteristic impedances between the resonant elements and the "necks" or coupling elements, for a narrow passband.

There is another important advantage in torsional operation. In the case of torsional operation, the quantity corresponding to characteristic (or mechanical) impedance is determined by the moment of inertia of the element about the axis and is not proportional to the cross-sectional area, as in the case of linear or longitudinal operation. Therefore, said quantity is proportional to the fourth power of the diameter for torsional operation, rather than to the square thereof, as for longitudinal operation. So, for torsion, a moderate ratio of diameters suffices to give a large ratio of impedances. Thus, the same filter which gives a wide band when operated longitudinally will give a narrow band when operated in torsion, even though only a simple coupling element is used. Or, to put it another way, a narrow band torsion filter can be made without a very great disparity in diameter between the tank and coupler portions. Thus, there can be loose coupling between the resonators and neck couplers (giving a narrow bandwidth) without unduly flimsy or thin necks. For the same bandwidth, the necks would have to be much flimsier, or of much smaller diameter, for longitudinal vibration than for torsional vibration.

The fractional bandwidth (that is, the ratio of the bandwidth in cycles per second to the midband frequency in cycles per second) is, in effect, squared when the same filter used for longitudinal operation is used for torsional operation. Thus, it has been found easy enough to obtain a bandwidth of the order of 1000 cycles at a midband frequency of 100 kilocycles, with a longitudinal type of filter. This would be a fractional bandwidth of .01, or 1 per cent. For the same filter used in torsion, the fractional bandwidth would be .0001, or .01 per cent, an extremely narrow band.

Now referring to Figs. 1 and 2, these figures represent respectively a plan view and an elevation of a simple and practical torsion filter arrangement according to this invention. A single-section filter, of the type shown in Fig. 4b of our parent application, is shown. This filter consists of a pair of aligned half-wave resonant elements 1 and 2 coupled by a quarter-wave neck 3. For convenience, elements 1 and 2 are shown in the drawing as being the same length as neck 3. Element 1 is the drive element or tank, while element 2 is the take-off tank. Elements 1, 2 and 3 are cylindrical in form and are preferably turned out of the same piece of round metallic stock, neck coupler 3 having a diameter considerably smaller than that of the two like tanks 1 and 2. The filter 1—3 is formed from a material having a very high Q, such as aluminum.

In order to provide magnetostrictive drive and take-off from the tanks, at least the end tanks 1 and 2 of the mechanical unit are provided with nickel plating. Nickel has good magnetostrictive activity. According to this invention, as shown in Fig. 2, only one-half of the circumference of the drive and take-off tanks 1 and 2 is plated with nickel. In Fig. 1, it is the upper half of the circumference (the side toward the reader) which is plated. In these figures, the nickel plating is represented by stippling.

A driving coil 4 is coupled to the central portion of drive tank 1. Coil 4 is in effect wound around this resonant element. Said coil is tuned by a condenser connected in parallel therewith and is connected to the output circuit of a driving amplifier tube 5. Tube 5 is supplied from a source of oscillatory energy. This source is of low radio frequency. Driving coil 4 acting on the tank 1 produces alternating longitudinal magnetization.

A take-off coil 6 is coupled to the central portion of take-off tank 2. Coil 6 is in effect wound around this resonant element. Said coil is tuned by a condenser connected in parallel therewith and is connected to the input circuit of an amplifier tube 7. Tube 7 may be termed a signal utilization means.

By means of a pair of polarizing magnets 8 and 9 which are placed transversely to the axis of element 1, a transverse magnetic field is applied to tank 1 in the plane including the edges of the nickel plating. This arrangement is more clearly shown in Fig. 2, from which it may be seen that lines of magnetic flux between 8 and 9 extend vertically and in a plane including the edges of the plating. In Fig. 2, the drive and take-off coils have been omitted, for the sake of simplicity. In other words, the plane of the magnetic field is parallel to the plane including the edges of the nickel plating on tank 1. Although two separate magnets 8 and 9 are illustrated, it will be appreciated that a single horseshoe magnet could be used instead, if desired.

The combination of the constant transverse magnetization (produced by 8 and 9) and the alternating longitudinal magnetization produced by the driving coil 4 gives a resultant magnetization which swings back and forth in direction about a mean position approximately transverse to the axis of the resonator 1. This, due to magnetostrictive action of the nickel coating, tends to twist the ends of resonator 1 first one way and then the other about its central plane. Thus, tank or resonant element 1 is caused to execute torsional vibrations.

By driving the mechanical filter 1—3 in torsion, the advantages resulting from torsional operation, in mechanical bandpass filters, are realized.

The action at the opposite end tank 2 is the converse of that described in connection with tank 1. Due to the constant transverse magnetization provided by magnets 10 and 11 and to the torsional motion of the magnetostrictively-active material, an alternating voltage is induced in coil 6 and fed to utilization means 7. Here, again, the magnetization provided by 10 and 11 is in a plane including the edges of the nickel plating on tank 2. Also, the two magnets 10 and 11 can be replaced by a single horseshoe magnet, if desired.

A "neck-coupled" filter is illustrated in Fig. 1. This is one in which the coupling element is of smaller diameter than the resonant elements. This illustration is only by way of example. It is pointed out that this invention is equally applicable to "slug-coupled" filters, in which the coupling element or elements are of larger diameter than the resonant elements. Filters of the latter type are disclosed in Figs. 2, 4c, 5, etc. of our parent application. It is to be understood that this invention is applicable generally to mechanical filters of the type wherein resonant elements are joined together by coupling elements the mechanical impedances of which are different from those of the resonant elements.

Further, although only a single-section filter is shown in Fig. 1, this has been done only in order to simplify the drawing. Actually, a multisection filter, consisting of two or more sections, having a construction such as disclosed in our parent application, may be operated in torsion according to the teachings of Fig. 1. The two end tanks, at least, of such a filter must be half-circumferentially plated with magnetostrictive material, and constant transverse magnetization provided for such tanks. For example, extremely narrow band operation may be obtained when a multiple-neck-coupled filter, of the type disclosed in Fig. 10 of our parent application, is operated in torsion.

Figs. 3 and 4 represent a plan view and an elevation, respectively, of an alternative method of providing torsion drive. In these figures, elements similar to those of Figs. 1 and 2 are denoted by the same reference numerals. In this arrangement, as may be seen from Fig. 4 (the magnets and coils have been eliminated from Fig. 4 for clarity), the entire circumference of tank elements 1 and 2 is plated with nickel or other magnetostrictive material. However, a "bias twist" is provided on the plating, in order to obtain torsion drive.

One method of obtaining this "bias twist" is as follows. One end of unplated unit 1—3 is twisted a few degrees with respect to the other end and then clamped in this twisted position. The resonator unit 1—3 is held in this clamp while being nickel plated, so that it is kept twisted during plating. After plating, it is unclamped or freed, so that it untwists or returns of its original condition, thus twisting the nickel plating. This provides a "bias twist" on the magnetostrictive (nickel) plating.

Another method of obtaining a bias twist on the plating is as follows. The unplated unit 1—3 is twisted beyond its elastic limit, so that it yields slightly. Following this, it is nickel plated. It is then annealed, which causes it to return towards its original condition, thus twisting the nickel plating. This provides a bias twist on the magnetostrictive (nickel) plating. This method has a slight advantage over that described in the preceding paragraph, in that the necessity of maintaining the unit clamped while plating is dispensed with.

With the bias twist of the nickel plating, the coil and field arrangement are the same as for longitudinal drive. The filter will therefore respond also in the longitudinal mode, but this occurs at so far different a frequency that the tuned circuits largely suppress such response. Coils 4 and 6 are coupled to tanks 1 and 2, respectively, as in Fig. 1. Coil 4 is connected to a driving source. Coil 6 is connected to a utilization circuit. Polarizing magnets 8 and 9 are positioned to apply an axial or longitudinal magnetic field to the unit 1—3. Due to the bias twist on the magnetostrictive plating of the unit, when coil 4 is energized torsional vibrations result. These are transmitted to tank 2 through element 3 and in tank 2 are converted into a corresponding voltage in coil 6.

The unit 1—3, the nickel plating on which has been provided with a bias twist according to either of the procedures described above, is arranged in accordance with Figs. 3 and 4 to provide torsional operation of the filter. Here, the coil and field arrangement is the same as for longitudinal drive. However, as previously stated, torsional operation results.

In Figs. 3 and 4, as in Fig. 1, multisection filters may be used, instead of the single-section filter shown. Also, slug-coupled filters may be used, instead of the neck-coupled filter illustrated.

What we claim to be our invention is as follows:

1. A mechanical filter, comprising a plurality of aligned substantially similar resonant elements joined together by intervening coupling elements, said coupling elements and said resonant elements having circular cross-sections of different diameters, each of the two end resonant elements of said filter including magnetostrictive material which extends over only substantially one-half of its circumference, means for establishing magnetic fields through said material in directions transverse to the longitudinal axis of the end elements and in planes including the edges of the magnetostrictive material, a driving coil coupled to one of said end elements and to a source of alternating voltage for establishing an alternating longitudinal magnetic field through said one element, thereby forcing said filter to execute torsional mechanical vibrations, and a take-off coil coupled to the other of said end elements for converting the torsional vibrations of said filter into a voltage.

2. A mechanical filter, comprising a plurality of aligned substantially similar resonant elements joined together by intervening coupling elements, said coupling elements and said resonant elements having circular cross-sections of different diameters, each of the two end resonant elements of said filter being plated with magnetostrictive material over only substantially one-half of its circumference, means for establishing magnetic fields through said material in directions transverse to the longitudinal axis of the end elements and in planes including the edges of the plating, a driving coil coupled to one of said end elements and to a source of alternating voltage for establishing an alternating longitudinal magnetic field through said one element, thereby forcing said filter to execute torsional mechanical vibrations, and a take-off coil coupled to the other of said end elements for converting the torsional vibrations of said filter into a voltage.

3. A torsional resonator assembly, comprising a torsional resonator formed by a figure of revolution, a plating of magnetostrictive material extending over less than the entire circumference of said resonator, and means for establishing a magnetic field linking said plating, in a direction transverse to the longitudinal axis of the resonator and in a plane including the edges of the plating.

LESLIE L. BURNS, Jr.
WALTER van B. ROBERTS.

References Cited in the file of this patent

UNITED STATES PATENTS

| Number | Name | Date |
|---|---|---|
| 1,882,397 | Pierce | Oct. 11, 1932 |
| 2,441,158 | Krasnow | May 11, 1948 |
| 2,501,488 | Adler | Mar. 21, 1950 |
| 2,566,984 | Firth | Sept. 4, 1951 |
| 2,615,981 | Doelz | Oct. 28, 1952 |

FOREIGN PATENTS

| Number | Country | Date |
|---|---|---|
| 363,848 | Italy | Oct. 14, 1938 |